United States Patent
Monden et al.

(10) Patent No.: US 8,384,351 B2
(45) Date of Patent: Feb. 26, 2013

(54) BATTERY SYSTEM USING BATTERY UNIT IN WHICH BATTERY ARMS ARE CONNECTED IN PARALLEL

(75) Inventors: Yukitaka Monden, Kawasaki (JP); Ryuichi Morikawa, Higashimurayama (JP); Mami Mizutani, Hachioji (JP); Yuki Kuwano, Fuchu (JP); Masayuki Kubota, Fuchu (JP); Yasuyuki Ito, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 668 days.

(21) Appl. No.: 12/566,997

(22) Filed: Sep. 25, 2009

(65) Prior Publication Data

US 2010/0079108 A1    Apr. 1, 2010

(30) Foreign Application Priority Data

Sep. 30, 2008  (JP) ................ 2008-253960

(51) Int. Cl.
*H02J 7/04* (2006.01)
(52) U.S. Cl. ........ 320/116; 320/134; 320/120; 320/121; 320/136
(58) Field of Classification Search .......... 320/116, 320/117, 120, 121, 134, 136
See application file for complete search history.

(56) References Cited

U.S. PATENT DOCUMENTS

| | | | |
|---|---|---|---|
| 7,847,436 B2 * | 12/2010 | Blackmond | ......... 307/71 |
| 2006/0192529 A1 | 8/2006 | Kimura et al. | |

FOREIGN PATENT DOCUMENTS

| | | |
|---|---|---|
| CN | 1825676 A | 8/2006 |
| JP | 2001-185228 | 7/2001 |
| JP | 2007-110887 | 4/2007 |
| JP | 2007-282375 | 10/2007 |

OTHER PUBLICATIONS

Office Action issued Nov. 24, 2011 in China Application No. 200910175884.3.
Office Action (with English translation) issued on Sep. 25, 2012, in counterpart Japanese Appln No. 2008-253960 (2 pages).

* cited by examiner

*Primary Examiner* — Jay Patidar
(74) *Attorney, Agent, or Firm* — Oblon, Spivak, McClelland, Maier & Neustadt, L.L.P.

(57) ABSTRACT

A battery system includes a battery unit in which battery arms are connected in parallel, and a charge/discharge control device that controls charge/discharge of the battery unit. Each of the battery arms includes: a battery composed of one or more battery cells connected in series; a switch connected in series to the battery; and a battery monitoring device that, in a case of having detected abnormality of the battery, opens the switch to thereby isolate the battery arm including the abnormal battery, and sends a switch opening signal indicating that the switch has been opened to the charge/discharge control device. The charge/discharge control device performs a control to reduce a charge/discharge current or charge/discharge power of the battery unit when the switch opening signal is sent from the battery monitoring device of the battery unit to the charge/discharge control device.

3 Claims, 10 Drawing Sheets

BATTERY SYSTEM USING BATTERY UNIT IN WHICH BATTERY ARMS ARE CONNECTED IN PARALLEL

BACKGROUND OF THE INVENTION

1. Field of the Invention

The present invention relates to a battery unit in which battery arms are connected in parallel, and to a battery system using the battery unit.

2. Description of the Related Art

In a conventional battery system, a battery charge/discharge switching method has been known, which is capable of achieving reduction in size, weight and cost by omitting or downsizing a cooling device while reducing a conduction loss to a semiconductor switch, and is capable of eliminating an occurrence of mechanical abrasion or operation sounds, which follow frequent on/off operations of a mechanical contact switch (refer to Japanese Patent Laid-Open Publication No. 2007-110887 as Patent Publication 1).

In this battery charge/discharge switching method, a charge/discharge switching circuit in which the mechanical contact switch, the semiconductor switch and a diode are connected in parallel is connected in series to each of batteries. Then, at a discharging time when a large current is passed and in an operation range of charging the large current, the current is passed by means of the mechanical contact switch, whereby the conduction loss is reduced. Meanwhile, in an operation range of charging a small current, the current is passed by means of the semiconductor switch, whereby the conduction loss is reduced. With such a configuration, the operation sounds caused by on/off operations in a pulse charge and by an off operation at the time when the charge is completed are suppressed.

SUMMARY OF THE INVENTION

In the above-mentioned related art, the diode is connected in parallel to the mechanical contact switch and the semiconductor switch. Accordingly, even if abnormality occurs in the batteries, a discharge current continues to flow therefrom. As a result, there has been a problem that battery cells turn to an over discharge state and to a reverse discharge state, resulting in that it becomes difficult to continue to operate the battery system.

It is an object of the present invention to provide a battery unit in which battery arms are connected in parallel, the battery unit being capable of continuing an operation thereof even if abnormality occurs in batteries included in battery arms of the battery unit concerned, and to provide a battery system using the battery unit.

In order to achieve the above-described object, a battery system according to a first aspect of the present invention includes: a battery unit in which battery arms are connected in parallel; and a charge/discharge control device that controls charge/discharge of the battery unit. Then, each of the battery arms of the battery unit includes: a battery composed of one or more battery cells connected in series to the battery; and a battery monitoring device that, in a case of having detected abnormality of the battery, opens the switch to thereby isolate the battery arm including the abnormal battery, and sends a switch opening signal indicating that the switch has been opened to the charge/discharge control device. The charge/discharge control device performs control to reduce a charge/discharge current or charge/discharge power of the battery unit in a case of having received the switch opening signal from the battery monitoring device of the battery unit.

In accordance with the battery system according to the first aspect of the present invention, even in the case where a part of the battery arms included in the battery unit is isolated by the switch in response to the occurrence of the abnormality in the battery, the charge/discharge current or the charge/discharge power, which flows through the battery unit, is reduced, whereby an overcurrent of the charge/discharge current flowing through the battery arms is prevented. Therefore, even after the switch is opened, the battery unit can continue the operation thereof.

In the battery system according to the first aspect of the present invention, in the case of having received the switch opening signals from the battery unit, the charge/discharge control device may perform control to reduce the charge/discharge current or charge/discharge power of the battery unit step by step in response to the number of the received switch opening signals.

With such a configuration, even in the case where a part of the battery arms included in the battery unit is isolated by the switches in response to the occurrence of the abnormality in the batteries, the charge/discharge current or the charge/discharge power, which flows through the battery unit, is reduced step by step in response to the number of the isolated battery arms, whereby the overcurrent of the charge/discharge current flowing through the battery arms is prevented. Therefore, even after the switches are opened, the battery unit can continue the operation thereof.

Alternatively, in the battery system according to the first aspect of the present invention, in the case of having received the switch opening signals from the battery unit, the charge/discharge control device may perform the control to reduce the charge/discharge current or charge/discharge power of the battery unit in a ratio of the number of the switch opening signals with respect to the total number of the battery arms included in the battery unit.

With such a configuration, even in the case where a part of the battery arms included in the battery unit is isolated by the switches in response to the occurrence of the abnormality in the batteries, the charge/discharge current or the charge/discharge power is reduced in a ratio of the number of the isolated battery arms with respect to the total number of the battery arms, whereby the charge/discharge current flowing through the battery arms is set at the same value as that of the time when the battery unit is normal, and the overcurrent of the charge/discharge current flowing through the battery arms is prevented. Therefore, even after the switches are opened, the battery unit can continue the operation thereof.

A battery system according to a second aspect of the present invention includes: a battery unit in which battery arms are connected in parallel; and a charge/discharge control device that controls charge/discharge of the battery unit. Then, each of the battery arms of the battery unit includes: a battery composed of one or more battery cells connected in series; a fuse connected in series to the battery; and a fuse monitoring device that, in a case of having detected a blowout of the fuse, sends a fuse blowout signal indicating that the blowout of the fuse has been detected to the charge/discharge control device. The charge/discharge control device performs control to reduce a charge/discharge current or charge/discharge power of the battery unit in a case of having received the fuse blowout signal from the fuse monitoring device of the battery unit.

In accordance with the battery system according to the second aspect of the present invention, even in the case where a part of the battery arms included in the battery unit is isolated by the fuses in response to the occurrence of the abnormality in the batteries, the charge/discharge current or charge/discharge power of the battery unit is reduced, whereby the overcurrent of the charge/discharge current flowing through the battery arms is prevented. Therefore, even after the fuses cause the blowout, the battery unit can continue the operation thereof.

A battery unit according to a third aspect of the present invention includes battery arms connected in parallel. Then, each of the battery arms includes: a battery composed of one or more battery cells connected in series; a switch connected in series to the battery; and a battery monitoring device that opens the switch to thereby isolate the battery arm in a case of having detected abnormality of the battery.

In the conventional battery unit, the operation of the whole of the battery unit has had to be stopped in the case where the battery abnormality has occurred in the battery arm. However, in accordance with the battery unit according to the third aspect of the present invention, the operation thereof can be continued by isolating the battery arm in which the abnormality has occurred.

DETAILED DESCRIPTION OF THE EMBODIMENTS

Hereinafter, a description is given of embodiments of the present invention with reference to the drawings.

Embodiment 1

Figure 1:
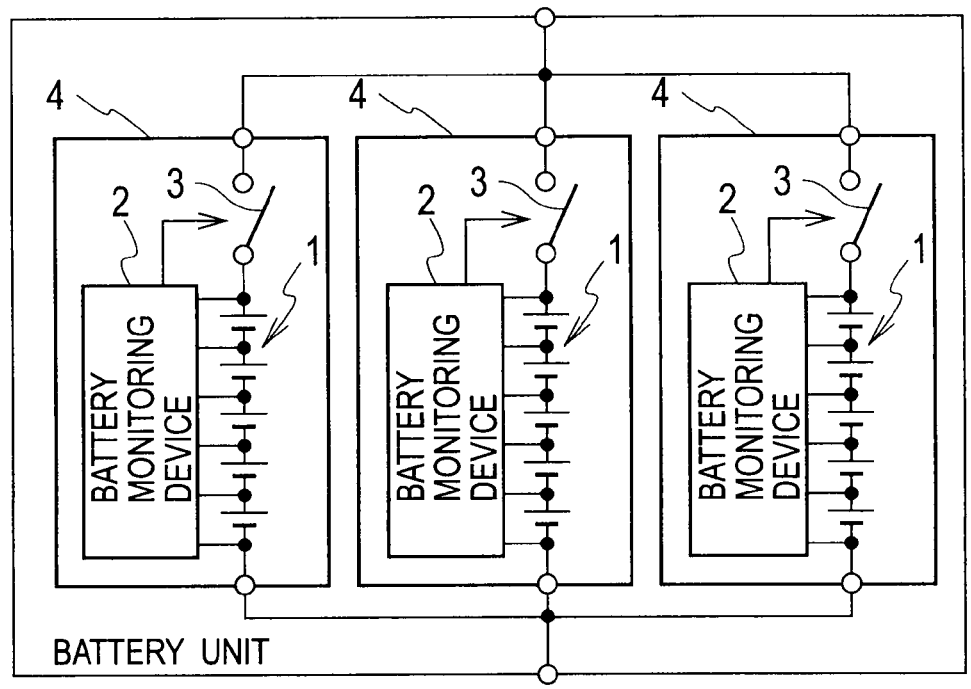
FIG. 1 is a block diagram showing a configuration of a battery unit according to Embodiment 1 of the present invention.

A battery unit according to Embodiment 1 of the present invention, which is shown in FIG. 1, is composed in such a manner that battery arms 4 (three pieces in the example shown in FIG. 1) are connected in parallel in order to increase a battery capacity. Each of the battery arms 4 includes a battery 1, a battery monitoring device 2, and a switch 3.

The battery 1 is configured of battery cells composed of secondary batteries such as lithium-ion batteries and nickel-hydrogen batteries. Since the single battery cell has limitations in energy capacity and output voltage, the battery 1 is configured in such a manner that the battery cells are connected in series. In such a way, in the battery 1, the output voltage and the energy capacity are increased.

The battery monitoring device 2 is connected to a positive electrode and negative electrode of each of the battery cells composing the battery 1, and detects a battery voltage, a battery temperature and the like of each of the battery cells. The battery monitoring device 2 monitors whether or not the battery 1 is operating normally while detecting the battery voltage, the battery temperature and the like. The battery monitoring device 2 sends a control signal to the switch 3 that instructs the switch 3 to open in the case of having detected battery abnormality (abnormality of the battery voltage, the battery temperature or the like).

The switch 3 turns off in response to the control signal sent from the battery monitoring device 2. In such a way, a current flowing from the battery 1, that is, the battery arm 4 is cut off.

Next, while referring to FIG. 2, a description will be made of operations of the battery unit according to Embodiment 1 of the present invention by focusing on battery unit monitoring processing thereof. When the monitoring of the battery unit is started, first, it is investigated whether or not abnormality of each of the battery arms has been detected (Step S11). Specifically, the battery monitoring device 2 detects the battery voltages, the battery temperatures and the like of the battery cells composing the battery 1, and investigates whether or not these battery voltages, battery temperatures and the like are normal. When it is determined that the abnormality of the battery arm has not been detected in Step S11, it is monitored whether or not the abnormality occurs in each of the battery arms 4 while repeatedly executing Step S11.

Meanwhile, when it is determined that the abnormality of the battery arm has been detected in Step S11, the switch of the battery arm in which the abnormality has been detected is opened (Step S12). Specifically, when the control signal is sent from the battery monitoring device 2 to the switch 3, the switch 3 concerned is opened. Here, if it is defined that the number of the battery arms is N (N is an integer of 2 or more), then the number of the battery arms 4 of the battery unit becomes N−1 when one of the battery arms 4 causes the battery abnormality and the switch 3 of the battery arm 4 concerned is opened. Then, the battery unit can continue a charge/discharge operation by using the N−1 pieces of remaining battery arms 4.

As described above, heretofore, the operation of the whole of the battery unit has had to be stopped in the case where the battery abnormality has occurred in the battery arm. However, in the battery unit according to Embodiment 1 of the present invention, the operation thereof can be continued by isolating only the battery arm 4 in which the abnormality has occurred.

Embodiment 2

Figure 3:
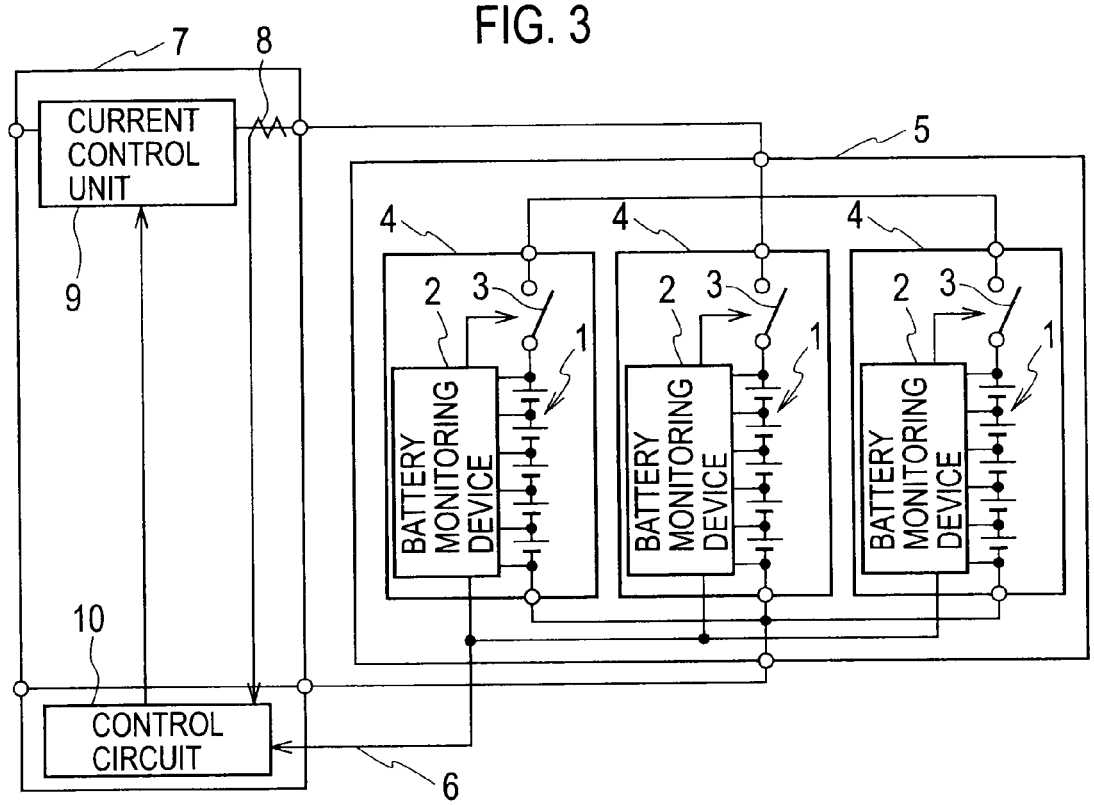
FIG. 3 is a block diagram showing a configuration of a battery system according to Embodiment 2 of the present invention.

A battery system according to Embodiment 2 of the present invention, which is shown in FIG. 3, includes a battery unit 5, and a charge/discharge control device 7. The battery unit 5 is composed by adding the following function to the battery unit according to Embodiment 1 described above. Specifically, in the case of having sent the control signal to the switch 3 and having opened the switch 3 concerned, each of the battery monitoring devices 2 of the battery unit 5 sends a switch opening signal, which indicates that the switch 3 has been opened, to the charge/discharge control device 7 through a communication channel 6. Note that the battery unit 5 is the same as the battery unit according to Embodiment 1 except the above-described point. Accordingly, the same reference numerals are assigned to the same constituents as those used in FIG. 1, and a description thereof will be omitted.

The charge/discharge control device 7 includes a current detector 8, a current control unit 9, and a control circuit 10. The current detector 8 detects a charge/discharge current flowing between the charge/discharge control device 7 and the battery unit 5. A current value of the charge/discharge current detected by the current detector 8 is sent to the control unit 10.

The current control unit 9 controls a magnitude of the charge/discharge current, which flows between the charge/discharge control device 7 and the battery unit 5, in response to an instruction from the control circuit 10.

When the switch opening signal is sent from the battery unit 5 through the communication channel 6 to the control unit 10, the control circuit 10 decides an upper limit value of the charge/discharge current, which should flow between the charge/discharge control device 7 and the battery unit 5, at a current value smaller than an upper limit value of the charge/discharge current of the case where the battery unit 5 is normal (the case where there is no abnormality in the battery arms 4). Then, the control circuit 10 refers to the current value detected by the current detector 8, and instructs the current control unit 9 to restrict the charge/discharge current to the decided current value or less.

Figure 4:
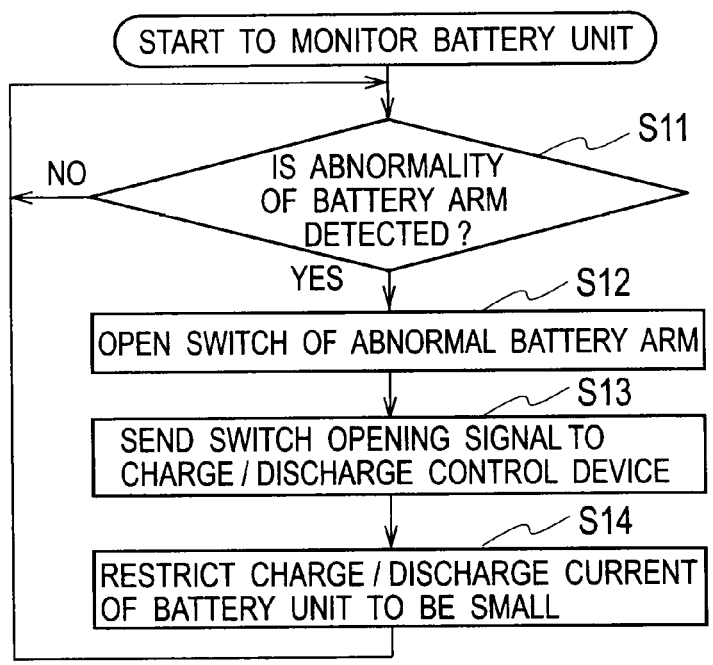
FIG. 4 is a flowchart showing operations of the battery system according to Embodiment 2 of the present invention.

Next, while referring to FIG. 4, a description will be made of operations of the battery system according to Embodiment 2 of the present invention by focusing on battery unit monitoring processing thereof. Note that, in a flowchart of FIG. 4, steps of executing the same processing as the processing of the battery unit according to Embodiment 1, which is shown in the flowchart of FIG. 2, will be described while assigning the reference numerals used in FIG. 2 thereto.

Figure 2:
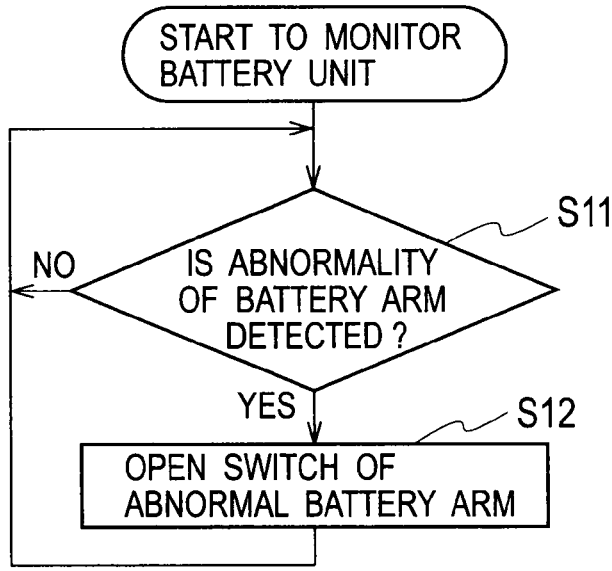
FIG. 2 is a flowchart showing operations of the battery unit according to Embodiment 1 of the present invention.

First, since processing of Step S11 and Step S12 is the same as that shown in FIG. 2, a description thereof will be omitted. Subsequently, the switch opening signal is sent to the charge/discharge control device (Step S13). Specifically, the battery monitoring device 2 creates the switch opening signal, and sends the switching opening signal to the control circuit 10 through the communication channel 6.

Subsequently, the charge/discharge current of the battery unit is restricted to be small (Step S14). Specifically, the control circuit 10 instructs the current control unit 9 to restrict the charge/discharge current in response to the switch opening signal sent from the battery unit 5 through the communication channel 6. The current control unit 9 controls the magnitude of the charge/discharge current, which flows between the charge/discharge control device 7 and the battery unit 5, in response to the instruction from the control circuit 10. Thereafter, the operations return to Step S11, and the above-described processing is repeated.

In accordance with the battery system according to Embodiment 2, even in the case where a part of the battery arms 4 included in the battery unit 5 is isolated by the switches 3 in response to the occurrence of the abnormality in the batteries 1, the charge/discharge current flowing through the battery unit 5 is set at the current value smaller than that of the time when the battery unit 5 is normal, whereby an overcurrent of the charge/discharge current flowing through the battery unit 5 is prevented. Therefore, even after the switch 3 is opened, the battery unit 5 can continue the operation thereof.

Embodiment 3

In the case of having received the switch opening signals sent from the battery unit 5, a battery system according to Embodiment 3 of the present invention reduces the current value of the charge/discharge current step by step in response to the number of the switch opening signals. A configuration of the battery system according to Embodiment 3 is the same as the configuration of the battery system according to Embodiment 2, which is shown in FIG. 3, except the function of the control circuit 10.

In the case of having received the switch opening signals sent from the battery unit 5 through the communication channel 6, the control circuit 10 decides the upper limit value of the charge/discharge current, which should flow between the charge/discharge control device 7 and the battery unit 5, at a current value that becomes smaller step by step from the upper limit value of the charge/discharge current of the case where the battery unit 5 is normal in accordance with an increase of the number of the switch opening signals. Then, the control circuit 10 refers to the current value detected by the current detector 8, and instructs the current control unit 9 to restrict the charge/discharge current to the decided current value or less.

Figure 5:
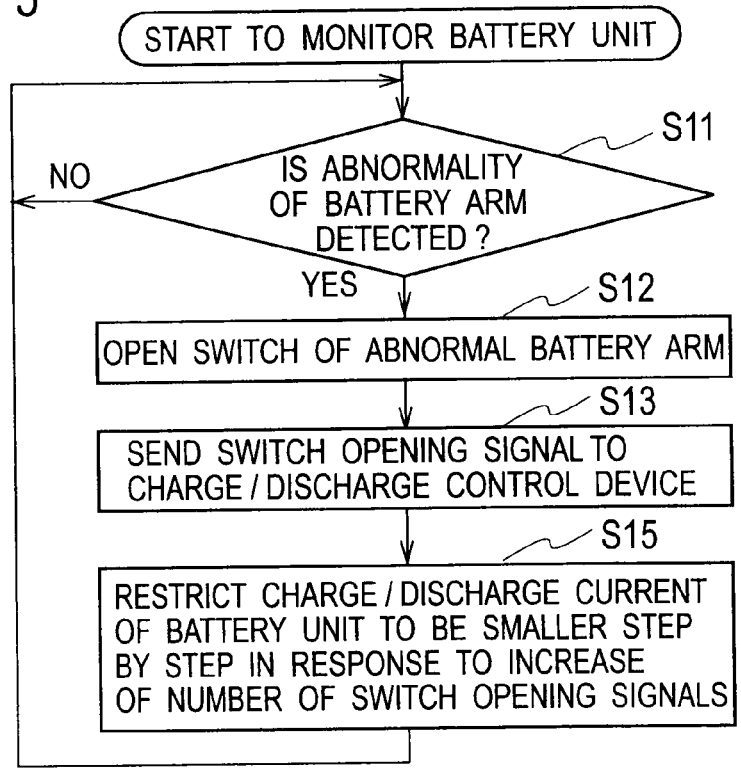
FIG. 5 is a flowchart showing operations of a battery system according to Embodiment 3 of the present invention.

Next, while referring to FIG. 5, a description will be made of operations of the battery system according to Embodiment 3 of the present invention by focusing on battery unit monitoring processing thereof. Note that, in a flowchart of FIG. 5, steps of executing the same processing as the processing of the battery system according to Embodiment 2, which is shown in the flowchart of FIG. 4, will be simply described while assigning the reference numerals used in FIG. 4 thereto.

First, since processing of Step S11 and Step S12 is the same as that shown in FIG. 2, a description thereof will be omitted. Subsequently, the switch opening signals are sent to the charge/discharge control device (Step S13).

Subsequently, the charge/discharge current of the battery unit is restricted to be smaller step by step in response to the increase of the number of the switch opening signals (Step S15). Specifically, as described above, the control circuit 10 responds to each of the switch opening signals sent from the battery unit 5 through the communication channel 6, and instructs the current control unit 9 to reduce the charge/discharge current step by step in accordance with the increase of the number of the switch opening signals. The current control unit 9 responds to the instruction from the control circuit 10, and controls the magnitude of the charge/discharge current flowing between the charge/discharge control device 7 and the battery unit 5. Thereafter, the operations return to Step S11, and the above-described processing is repeated.

In accordance with the battery system according to Embodiment 3, even in the case where a part of the battery arms 4 included in the battery unit 5 is isolated by the switches 3 in response to the occurrence of the abnormality in the batteries 1, the charge/discharge current flowing through the battery unit 5 is reduced step by step in response to the number of the isolated battery arms 4, whereby the overcurrent of the charge/discharge current flowing through the battery arms 4 is prevented. Therefore, even after the switches 3 are opened, the battery unit 5 can continue the operation thereof.

Embodiment 4

In the case of having received the switch opening signals sent from the battery unit, a battery system according to Embodiment 4 of the present invention reduces the current value of the charge/discharge current in response to the number of battery arms, in each of which the abnormality has occurred, with respect to the total number of the battery arms. A configuration of the battery system according to Embodiment 4 is the same as the configuration of the battery system according to Embodiment 2, which is shown in FIG. 3, except the function of the control circuit 10.

In the case of having received Z pieces (Z is a positive integer, Z<N) of the switch opening signals sent from the battery unit 5 through the communication channel 6, the control circuit 10 decides the upper limit value of the charge/discharge current, which should flow between the charge/discharge control device 7 and the battery unit 5, so that the upper limit value can become a ratio Z/N of the number N of battery arms 4 and the number Z of switch opening signals. Then, the control circuit 10 refers to the current value detected by the current detector 8, and instructs the current control unit 9 to restrict the charge/discharge current to the decided current value or less.

Figure 6:
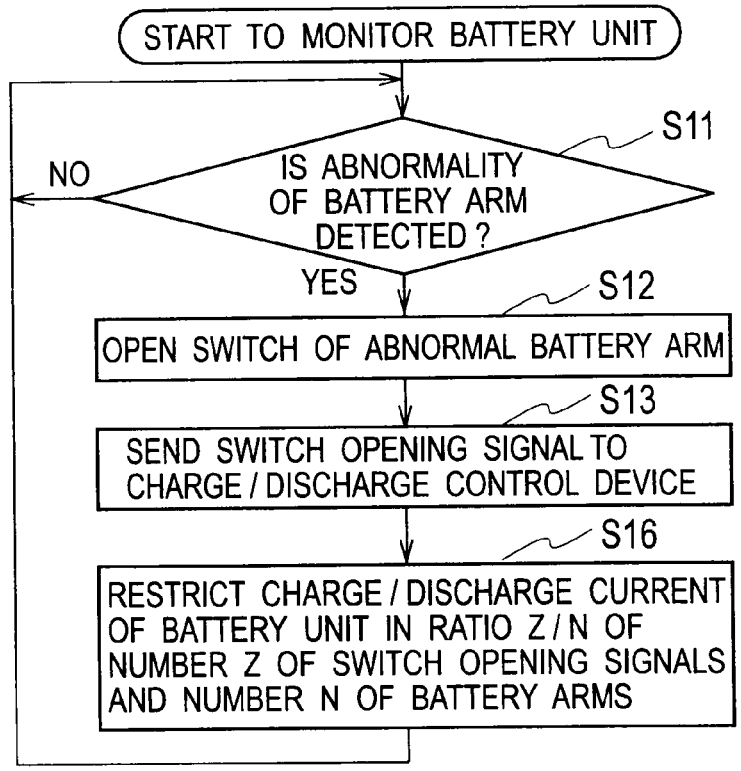
FIG. 6 is a flowchart showing operations of a battery system according to Embodiment 4 of the present invention.

Next, while referring to FIG. 6, a description will be made of operations of the battery system according to Embodiment 4 of the present invention by focusing on battery unit monitoring processing thereof. Note that, in a flowchart of FIG. 6, steps of executing the same processing as the processing of the battery system according to Embodiment 2, which is shown in the flowchart of FIG. 4, will be simply described while assigning the reference numerals used in FIG. 4 thereto.

First, since processing of Step S11 and Step S12 is the same as that shown in FIG. 2, a description thereof will be omitted. Subsequently, the switch opening signals are sent to the charge/discharge control device (Step S13).

Subsequently, the charge/discharge current of the battery unit is restricted in the ratio Z/N of the number Z of switch opening signals and the number N of battery arms (Step S16). Specifically, the control circuit 10 instructs the current control unit 9 to restrict the charge/discharge current in the ratio Z/N of the number N of battery arms 4 and the number Z of switch opening signals sent from the battery unit 5 through the communication channel 6. The current control unit 9 responds to the instruction from the control circuit 10, and controls the magnitude of the charge/discharge current flowing between the charge/discharge control device 7 and the battery unit 5. Thereafter, the operations return to Step S11, and the above-described processing is repeated.

In accordance with the battery system according to Embodiment 4, even in the case where a part of the battery arms 4 included in the battery unit 5 is isolated by the switches 3 in response to the occurrence of the abnormality in the batteries 1, the charge/discharge current is reduced in the ratio Z/N of the number Z of isolated battery arms 4 with respect to the number N of battery arms 4, and the charge/discharge current flowing through the battery arms 4 is set at the same value as that of the time when the battery unit 5 is normal, whereby the overcurrent of the charge/discharge current flowing through the battery arms 4 is prevented. Therefore, even after the switches 3 are opened, the battery unit 5 can continue the operation thereof.

Embodiment 5

Figure 7:
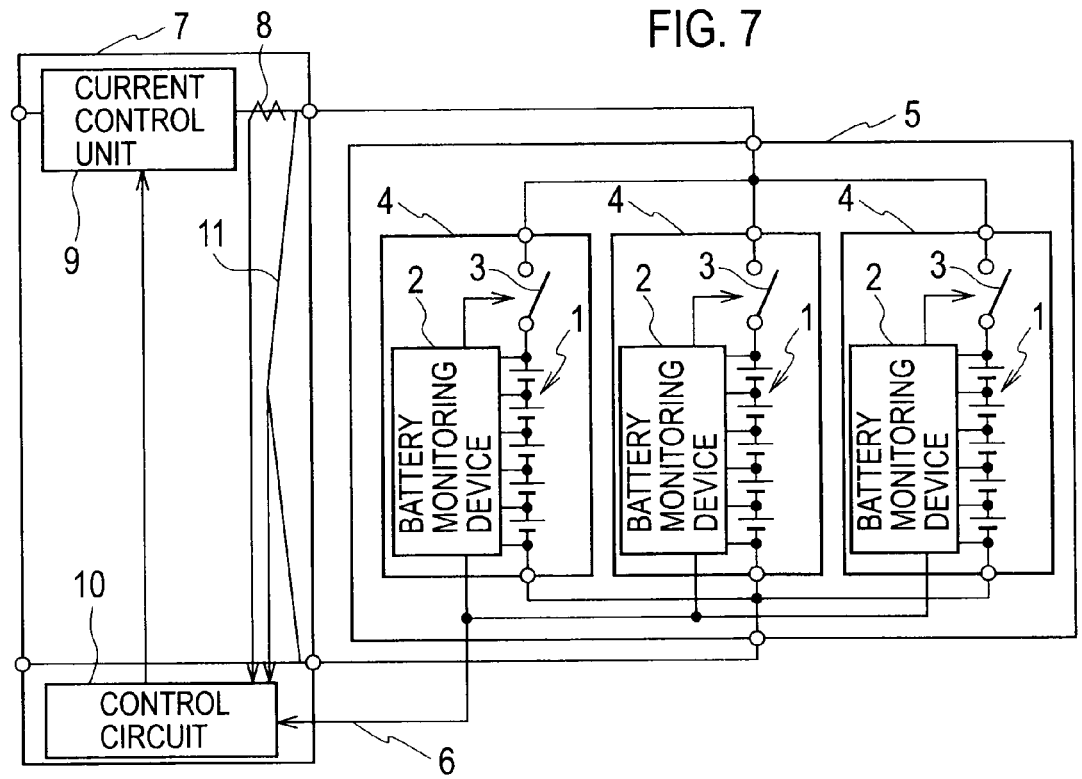
FIG. 7 is a block diagram showing a configuration of a battery system according to Embodiment 5 of the present invention.

A battery system according to Embodiment 5 of the present invention, which is shown in FIG. 7, is composed by adding a voltage detector 11 to the charge/discharge control device 7 of the battery system according to Embodiment 2. A description will be made below mainly of portions of the battery system according to Embodiment 5, which are different from those of the battery system according to Embodiment 2.

The voltage detector 11 detects an output voltage of the charge/discharge control device 7 (input voltage of the battery unit 5). The voltage detected by the voltage detector 11 is sent to the control circuit 10.

In the case of having received the switch opening signal sent from the battery unit 5 through the communication channel 6, the control circuit 10 decides an upper limit value of charge/discharge power, which is supplied from the charge/discharge control device 7 to the battery unit 5, so that the upper limit value of the charge/discharge power concerned can become smaller than an upper limit value of charge/discharge power of the case where the battery unit 5 is normal. Then, the control circuit 10 refers to a power value obtained by arithmetically operating the current value detected by the current detector 8 and the voltage value detected by the voltage detector 11, and instructs the current control unit 9 to restrict the charge/discharge power, which is supplied from the charge/discharge control device 7 to the battery unit 5, to the decided power value or less.

In this case, the control circuit 10 defines the charge/discharge power as a command value, calculates a power value, which is to be corrected, from a difference between the charge/discharge power obtained by the arithmetic operation and the command value, and divides the thus calculated power value by the output voltage detected by the voltage detector 11, thereby uses an obtained solution as a command for restricting the current, which is to be sent to the current control unit 9.

Figure 8:
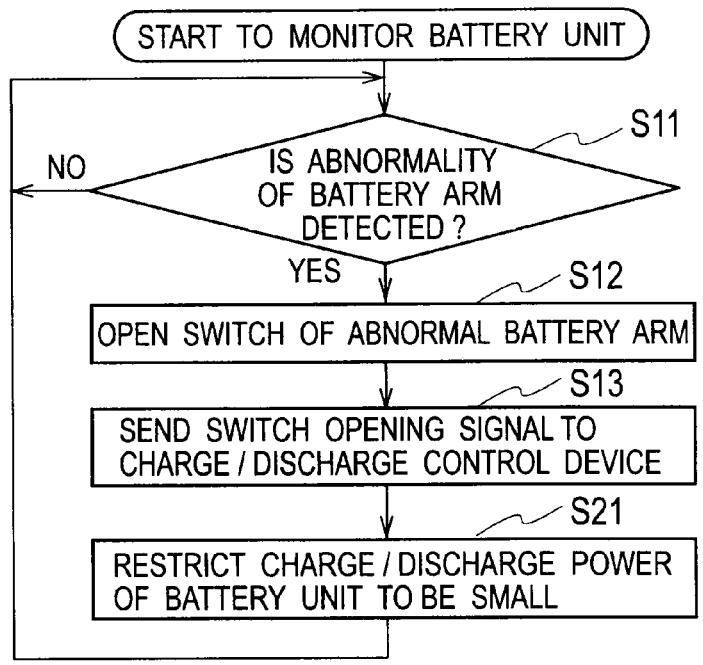
FIG. 8 is a flowchart showing operations of the battery system according to Embodiment 5 of the present invention.

Next, while referring to FIG. 8, a description will be made of operations of the battery system according to Embodiment 5 of the present invention by focusing on battery unit monitoring processing thereof. Note that, in a flowchart of FIG. 8, steps of executing the same processing as the processing of the battery system according to Embodiment 2, which is shown in the flowchart of FIG. 4, will be simply described while assigning the reference numerals used in FIG. 4 thereto.

First, since processing of Step S11 and Step S12 is the same as that shown in FIG. 2, a description thereof will be omitted. Subsequently, the switch opening signal is sent to the charge/discharge control device (Step S13).

Subsequently, the charge/discharge power of the battery unit is restricted to be small (Step S21). Specifically, the control circuit 10 responds to the switch opening signal sent from the battery unit 5 through the communication channel 6, and instructs the current control unit 9 to restrict the charge/discharge power. The current control unit 9 responds to the instruction from the control circuit 10, and controls a magnitude of the charge/discharge power from the charge/discharge control device 7 to the battery unit 5. Thereafter, the operations return to Step S11, and the above-described processing is repeated.

In accordance with the battery system according to Embodiment 5, even in the case where a part of the battery arms 4 included in the battery unit 5 is isolated by the switches 3 in response to the occurrence of the abnormality in the batteries 1, the charge/discharge power supplied to the battery unit 5 is reduced to a smaller power value than that of the time when the battery unit 5 is normal, whereby the overcurrent of the charge/discharge current flowing through the battery arms 4 is prevented. Therefore, even after the switch 3 is opened, the battery unit 5 can continue the operation thereof.

Embodiment 6

In the case of having received switch opening signals sent from the battery unit, a battery system according to Embodiment 6 of the present invention reduces the current value of the charge/discharge current step by step in response to the number of the switch opening signals. A configuration of the battery system according to Embodiment 6 is the same as the configuration of the battery system according to Embodiment 5, which is shown in FIG. 7, except the function of the control circuit 10.

In the case of having received the switch opening signals sent from the battery unit 5 through the communication channel 6, the control circuit 10 decides the upper limit value of the charge/discharge power, which should be supplied from the charge/discharge control device 7 to the battery unit 5, from the upper limit value of the charge/discharge power of the case where the battery unit 5 is normal to a power value that becomes smaller step by step in accordance with the increase of the number of the switch opening signals. Then, the control circuit 10 refers to a power value obtained by arithmetically operating the current value detected by the current detector 8 and the voltage value detected by the voltage detector 11, and instructs the current control unit 9 to restrict the charge/discharge power to the decided power value or less.

Figure 9:
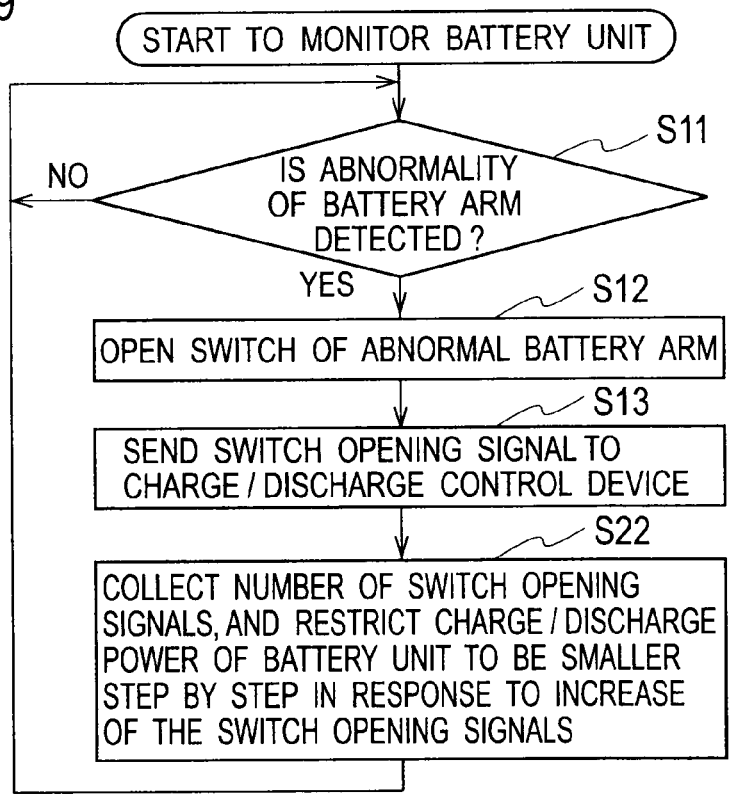
FIG. 9 is a flowchart showing operations of a battery system according to Embodiment 6 of the present invention.

Next, while referring to FIG. 9, a description will be made of operations of the battery system according to Embodiment 6 of the present invention by focusing on battery unit monitoring processing thereof. Note that, in a flowchart of FIG. 9, steps of executing the same processing as the processing of the battery system according to Embodiment 5, which is shown in the flowchart of FIG. 8, will be simply described while assigning the reference numerals used in FIG. 8 thereto.

First, since processing of Step S11 and Step S12 is the same as that shown in FIG. 2, a description thereof will be omitted. Subsequently, the switch opening signals are sent to the charge/discharge control device (Step S13).

Subsequently, the charge/discharge current of the battery unit is restricted to be smaller step by step (Step S22). Specifically, as mentioned above, the control circuit 10 responds to each of the switch opening signals sent from the battery unit 5 through the communication channel 6, and instructs the current control unit 9 to reduce the charge/discharge power in accordance with the increase of the number of the switch opening signals. The current control unit 9 responds to the instruction from the control circuit 10, and controls the magnitude of the charge/discharge power between the charge/discharge control device 7 and the battery unit 5. Thereafter, the operations return to Step S11, and the above-described processing is repeated.

In accordance with the battery system according to Embodiment 6, even in the case where the battery arms 4 included in the battery unit 5 are isolated by the switches 3 in response to the occurrence of the abnormality in the batteries 1, the charge/discharge power supplied to the battery unit 5 is reduced step by step in response to the number of the isolated battery arms 4, whereby the overcurrent of the charge/discharge current flowing through the battery arms 4 is prevented. Therefore, even after the switches 3 are opened, the battery unit 5 can continue the operation thereof.

Embodiment 7

In the case of having received the switch opening signals sent from the battery unit, a battery system according to Embodiment 7 of the present invention reduces the current value of the charge/discharge current in response to the number of battery arms, in each of which the abnormality has occurred, with respect to the total number of the battery arms. A configuration of the battery system according to Embodiment 7 is the same as the configuration of the battery system according to Embodiment 5, which is shown in FIG. 7, except the function of the control circuit 10.

In the case of having received the Z pieces of switch opening signals sent from the battery unit 5 through the communication channel 6, the control circuit 10 decides the upper limit value of the charge/discharge power, which should be supplied from the charge/discharge control device 7 to the battery unit 5, so that the upper limit value can become the ratio Z/N of the total number N of the battery arms 4 and the number Z of the switch opening signals. Then, the control circuit 10 refers to the power value obtained by arithmetically operating the current value detected by the current detector 8 and the voltage value detected by the voltage detector 11, and instructs the current control unit 9 to restrict the charge/discharge power to the decided power value or less.

Figure 10:
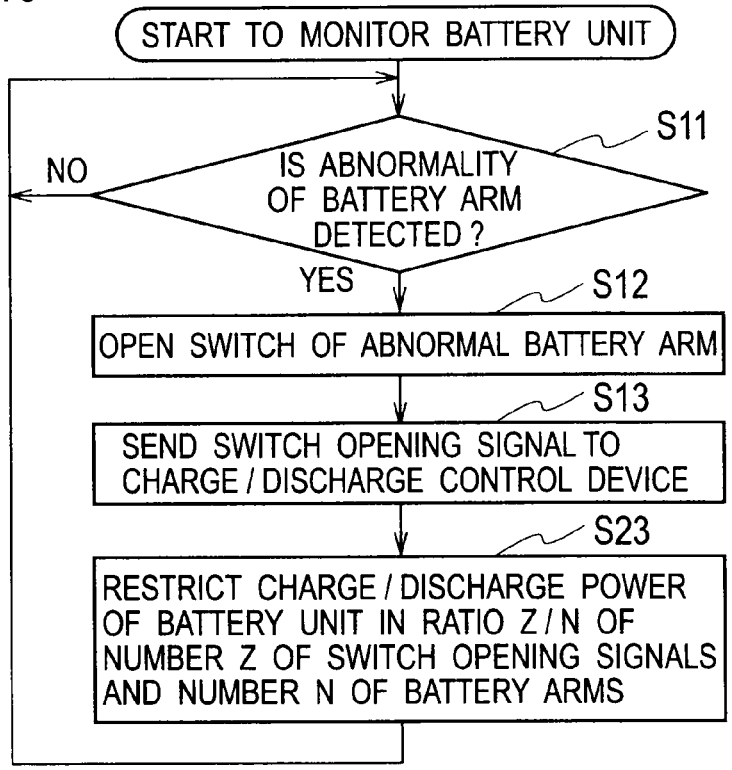
FIG. 10 is a flowchart showing operations of a battery system according to Embodiment 7 of the present invention.

Next, while referring to FIG. 10, a description will be made of operations of the battery system according to Embodiment 7 of the present invention by focusing on battery unit monitoring processing thereof. Note that, in a flowchart of FIG. 10, steps of executing the same processing as the processing of the battery system according to Embodiment 5, which is shown in the flowchart of FIG. 8, will be simply described while assigning the reference numerals used in FIG. 8 thereto.

First, since processing of Step S11 and Step S12 is the same as that shown in FIG. 2, a description thereof will be omitted. Subsequently, the switch opening signals are sent to the charge/discharge control device (Step S13).

Subsequently, the charge/discharge current of the battery unit is restricted in the ratio Z/N of the number Z of switch opening signals and the number N of the battery arms (Step S23). Specifically, the control circuit 10 instructs the current control unit 9 to restrict the charge/discharge power in the ratio Z/N of the number N of the battery arms 4 and the number Z of switch opening signals sent from the battery unit 5 through the communication channel 6. The current control unit 9 responds to the instruction from the control circuit 10, and controls the magnitude of the charge/discharge power supplied from the charge/discharge control device 7 to the battery unit 5. Thereafter, the operations return to Step S11, and the above-described processing is repeated.

In accordance with the battery system according to Embodiment 7, even in the case where a part of the battery arms 4 included in the battery unit 5 is isolated by the switches 3 in response to the occurrence of the abnormality in the batteries 1, the charge/discharge power is reduced in the ratio Z/N of the number Z of isolated battery arms 4 with respect to the number N of battery arms 4, and the charge/discharge current flowing through the battery arms 4 is set at the same value as that of the time when the battery unit 5 is normal, whereby the overcurrent of the charge/discharge current flowing through the battery arms 4 is prevented. Therefore, even after the switches 3 are opened, the battery unit 5 can continue the operation thereof.

Embodiment 8

Figure 11:
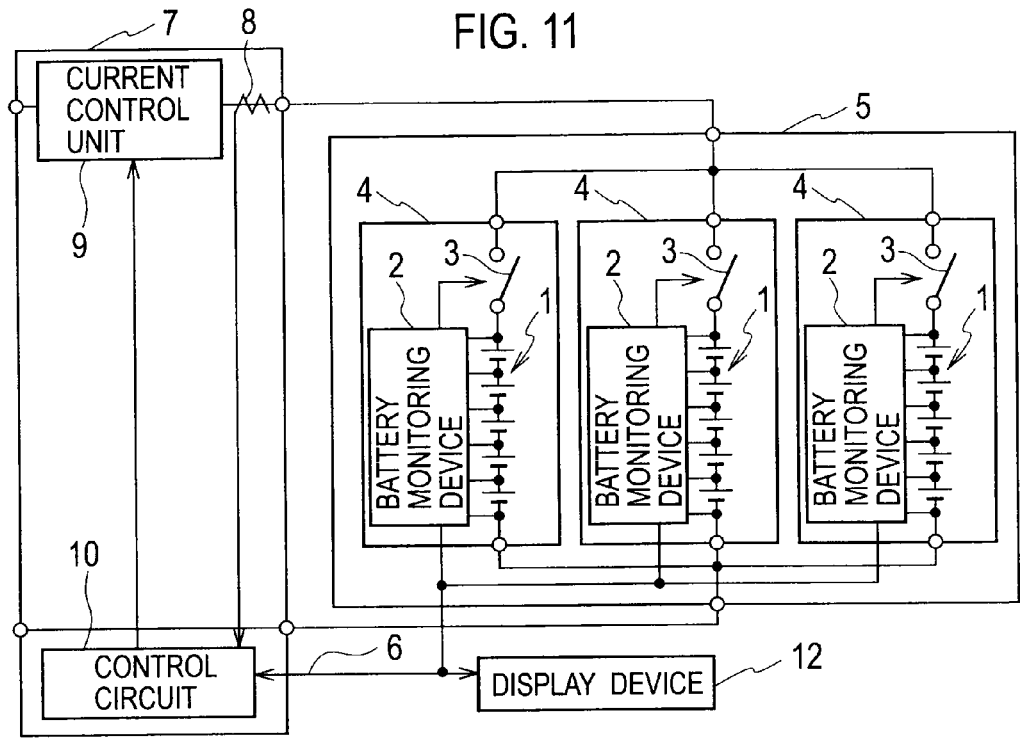
FIG. 11 is a block diagram showing a configuration of a battery system according to Embodiment 8 of the present invention.

A battery system according to Embodiment 8 of the present invention, which is shown in FIG. 11, is composed by adding a display device 12 to the battery system according to Embodiment 2. The display device 12 displays information, which indicates the battery arm 4 in which the switch 3 is opened, in response to the switch opening signal sent from the battery unit 5.

In accordance with the battery system according to Embodiment 8 of the present invention, the battery arm 4 including the battery 1 in which the abnormality has occurred can be identified by the display device 12. Therefore, in the battery system according to Embodiment 8 of the present invention, the battery 1 in which the abnormality has occurred can be urged to be exchanged, such an operation that requires the overcurrent for the battery arm 4 can be avoided, and so on.

Embodiment 9

Figure 12:
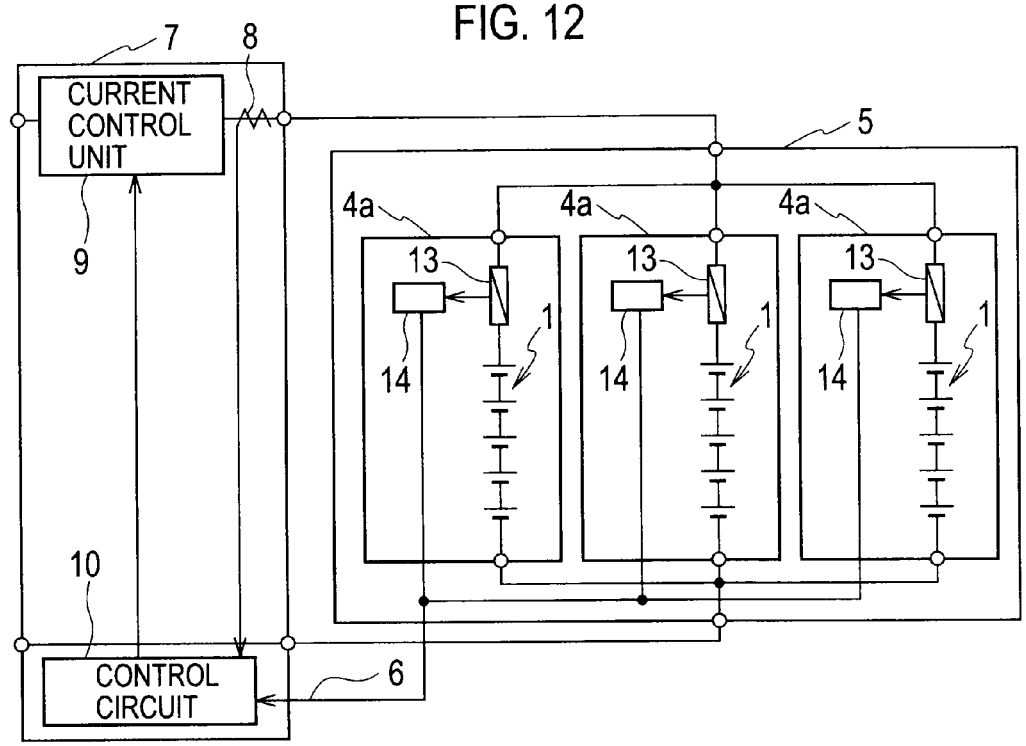
FIG. 12 is a block diagram showing a configuration of a battery system according to Embodiment 9 of the present invention.

A battery system according to Embodiment 9 of the present invention, which is shown in FIG. 12, is composed by changing, to battery arms 4a, the battery arms 4 included in the battery unit 5 of the battery system according to Embodiment 2. A description will be made below mainly of portions of the battery system according to Embodiment 9, which are different from those of the battery system according to Embodiment 2.

Each of the battery arms 4a includes a battery 1, a fuse 13 and a fuse monitoring device 14. The battery 1 according to Embodiment 9 is the same as that of the battery unit according to Embodiment 1. The fuse 13 is inserted into each of the battery arms 4a so as to be in series to the battery 1. Then, when the overcurrent flows through the fuse 13, the fuse 13 causes a blowout.

Each of the fuse monitoring devices 14 detects the blowout of the fuse 13 concerned. In the case of detecting that the fuse 13 has caused the blowout, the fuse monitoring device 14 sends a fuse blowout signal indicating that the fuse 13 has caused the blowout to the control circuit 10 through the communication channel 6.

When the fuse blowout signal is sent from the battery unit 5 through the communication channel 6 to the control circuit 10, the control circuit 10 decides the upper limit value of the charge/discharge current, which should flow between the charge/discharge control device 7 and the battery unit 5, at the current value smaller than the upper limit value of the charge/discharge current of the case where the battery unit 5 is normal (the case where there is no abnormality in the battery arms 4a). Then, the control circuit 10 refers to the current value detected by the current detector 8, and instructs the current control unit 9 to restrict the charge/discharge current to the decided current value or less.

Next, while referring to FIG. 13, a description will be made of operations of the battery system according to Embodiment 9 of the present invention by focusing on battery unit monitoring processing thereof.

When the monitoring of the battery unit is started, first, it is investigated whether or not the blowout of the fuse has been detected (Step S31). Specifically, the fuse monitoring device 14 detects whether or not the fuse 13 has caused the blowout. When it is determined in Step S31 that the blowout of the fuse has not been detected, the fuse monitoring device 14 monitors whether or not the fuse 13 causes the blowout while repeatedly executing Step S31.

Meanwhile, when it is determined in Step S31 that the blowout of the fuse has been detected, then the fuse blowout signal is subsequently sent to the charge/discharge control device (Step S32). Specifically, the fuse monitoring device 14 creates the fuse blowout signal, and sends the fuse blowout signal through the communication channel 6 to the control circuit 10 of the charge/discharge control device 7.

Subsequently, the charge/discharge current of the battery unit is restricted to be small (Step S33). Specifically, as mentioned above, the control circuit 10 instructs the current control unit 9 to restrict the charge/discharge current in response to the fuse blowout signal sent from the battery unit 5 through the communication channel 6. The current control unit 9 controls the magnitude of the charge/discharge current, which flows between the charge/discharge control device 7 and the battery unit 5, in response to the instruction from the control circuit 10. Thereafter, the operations return to Step S31, and the above-described processing is repeated.

In accordance with the battery system according to Embodiment 9, even in the case where a part of the battery arms 4 included in the battery unit 5 is isolated by the blowout of the fuses 13 in response to the occurrence of the abnormality in the batteries 1, the charge/discharge current flowing through the battery unit 5 is set at the current value smaller than that of the time when the battery unit 5 is normal, whereby the overcurrent of the charge/discharge current flowing through the battery arms 4a is prevented. Therefore, even after the fuses 13 cause the blowout, the battery unit 5 can continue the operation thereof.

Embodiment 10

In the case of having received fuse blowout signals sent from the battery unit 5, a battery system according to Embodiment 10 of the present invention reduces the current value of the charge/discharge current step by step in response to the number of the fuse blowout signals. A configuration of the battery system according to Embodiment 10 is the same as the configuration of the battery system according to Embodiment 9, which is shown in FIG. 12, except the function of the control circuit 10.

When the fuse blowout signals are sent from the battery unit 5 through the communication channel 6 to the control circuit 10, the control circuit 10 decides the upper limit value of the charge/discharge current, which should flow between the charge/discharge control device 7 and the battery unit 5, from the upper limit value of the charge/discharge current of the case where the battery unit 5 is normal to the current value that becomes smaller step by step in accordance with an increase of the number of the fuse blowout signals. Then, the control circuit 10 refers to the current value detected by the current detector 8, and instructs the current control unit 9 to restrict the charge/discharge current to the decided current value or less.

Next, while referring to FIG. 14, a description will be made of operations of the battery system according to Embodiment 10 of the present invention by focusing on battery unit monitoring processing thereof. Note that, in a flowchart of FIG. 14, steps of executing the same processing as the processing of the battery system according to Embodiment 9, which is shown in the flowchart of FIG. 13, will be simply described while assigning the reference numerals used in FIG. 13 thereto.

Figure 13:
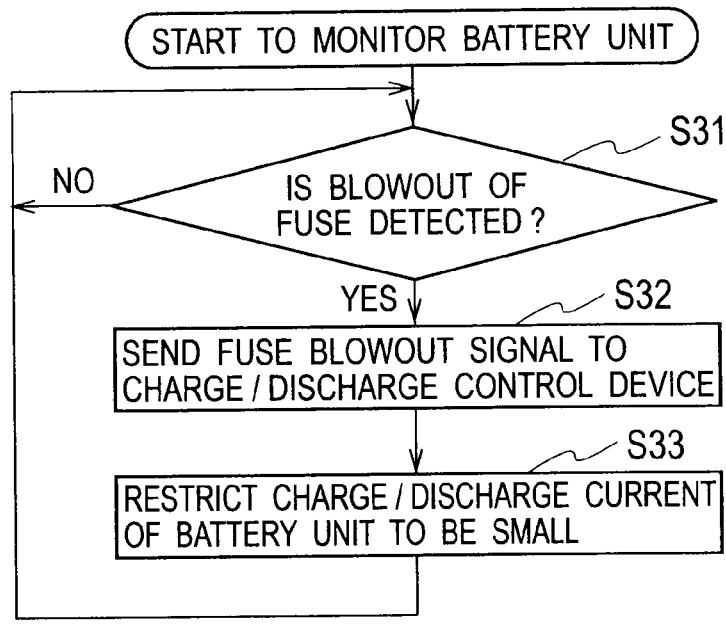
FIG. 13 is a flowchart showing operations of the battery system according to Embodiment 9 of the present invention.
Figure 14:
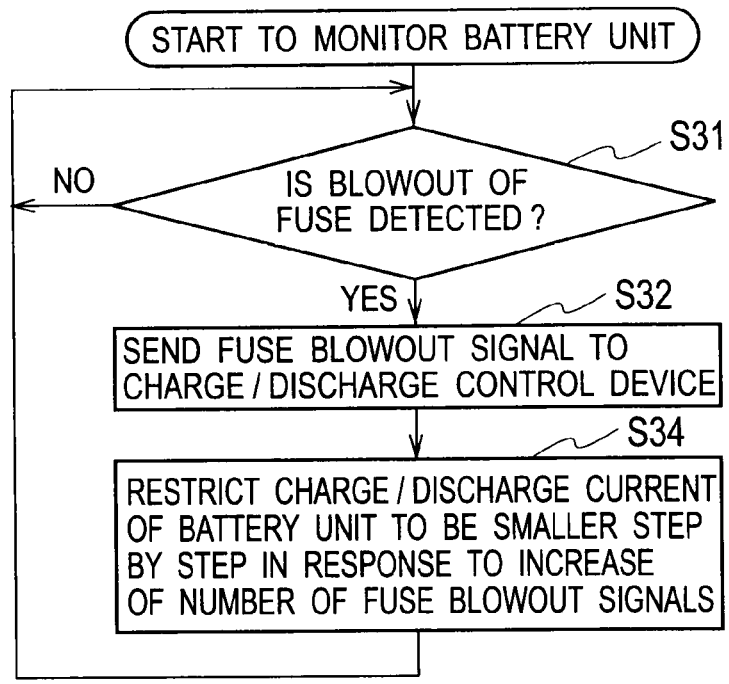
FIG. 14 is a flowchart showing operations of a battery system according to Embodiment 10 of the present invention.

Since processing of Step S31 and Step S32 is the same as that shown in FIG. 13, a description thereof will be omitted. Subsequently, the charge/discharge current of the battery unit is restricted to be smaller step by step in response to the increase of the number of the fuse blowout signals (Step S34). Specifically, the control circuit 10 responds to each of the fuse blowout signals sent from the battery unit 5 through the communication channel 6, reduces the charge/discharge current step by step in accordance with the increase of the number of the fuse blowout signals, and controls the magnitude of the charge/discharge current flowing between the charge/discharge control device 7 and the battery unit 5. Thereafter, the operations return to Step S31, and the above-described processing is repeated.

In accordance with the battery system according to Embodiment 10, even in the case where the battery arms 4a included in the battery unit 5 are isolated by the blowout of the fuses 13 in response to the occurrence of the abnormality in the batteries 1, the charge/discharge current flowing through the battery unit 5 is reduced step by step in response to the number of the isolated battery arms 4a. As a result, the overcurrent of the charge/discharge current flowing through the battery arms 4a is prevented. Therefore, even after the fuses 13 cause the blowout, the battery unit 5 can continue the operation thereof.

Embodiment 11

In the case of having received the fuse blowout signals sent from the battery unit 5, a battery system according to Embodiment 11 of the present invention reduces the current value of the charge/discharge current in response to the number of battery arms, in each of which the abnormality has occurred, with respect to the total number of the battery arms. A configuration of the battery system according to Embodiment 11 is the same as the configuration of the battery system according to Embodiment 9, which is shown in FIG. 12, except the function of the control circuit 10.

In the case of having received the Z pieces of fuse blowout signals sent from the battery unit 5 through the communication channel 6, the control circuit 10 decides the upper limit value of the charge/discharge current, which should flow between the charge/discharge control device 7 and the battery unit 5, so that the upper limit value can become the ratio Z/N of the total number N of the battery arms 4 and the number Z of the fuse blowout signals. Then, the control circuit 10 refers to the current value detected by the current detector 8, and instructs the current control unit 9 to restrict the charge/discharge current to the decided current value or less.

Figure 15:
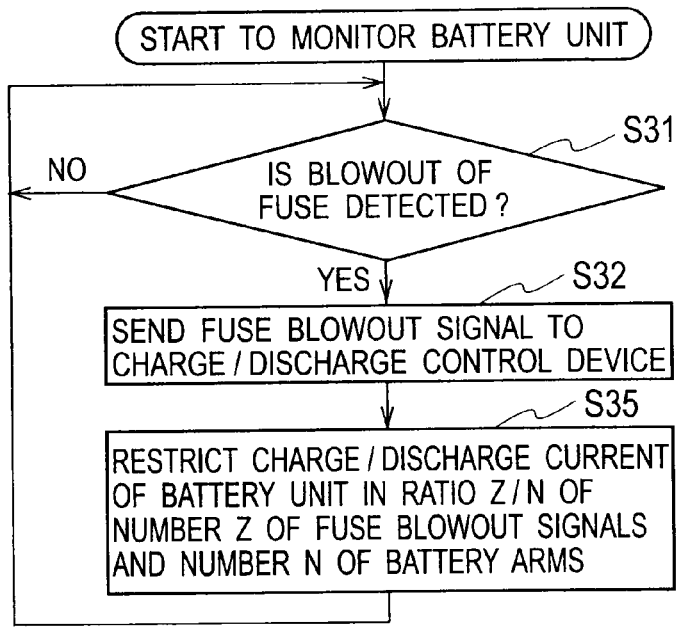
FIG. 15 is a flowchart showing operations of a battery system according to Embodiment 11 of the present invention.

Next, while referring to FIG. 15, a description will be made of operations of the battery system according to Embodiment 11 of the present invention by focusing on battery unit monitoring processing thereof. Note that, in a flowchart of FIG. 15, steps of executing the same processing as the processing of the battery system according to Embodiment 9, which is shown in the flowchart of FIG. 13, will be simply described while assigning the reference numerals used in FIG. 13 thereto.

Since processing of Step S31 and Step S32 is the same as that shown in FIG. 13, a description thereof will be omitted. Subsequently, the charge/discharge current of the battery unit is restricted in the ratio Z/N of the number Z of the fuse blowout signals and the number N of the battery arms (Step S35). Specifically, the control circuit 10 instructs the current control unit 9 to restrict the charge/discharge current in the ratio Z/N of the number N of the battery arms 4a and the number Z of the fuse blowout signals sent from the battery unit 5 through the communication channel 6. The current control unit 9 responds to the instruction from the control circuit 10, and controls the magnitude of the charge/discharge current flowing between the charge/discharge control device 7 and the battery unit 5. Thereafter, the operations return to Step S31, and the above-described processing is repeated.

In accordance with the battery system according to Embodiment 11, even in the case where a part of the battery arms 4a included in the battery unit 5 is isolated by the blowout of the fuses 13 in response to the occurrence of the abnormality in the batteries 1, the charge/discharge current is reduced in the ratio Z/N of the number Z of the isolated battery arms 4a with respect to the total number N of the battery arms 4a, and the charge/discharge current flowing through the battery arms 4a is set at the same value as that of the time when the battery unit 5 is normal. As a result, the overcurrent of the charge/discharge current flowing through the battery arms 4a is prevented. Therefore, even after the fuses 13 cause the blowout, the battery unit 5 can continue the operation thereof.

Embodiment 12

Figure 16:
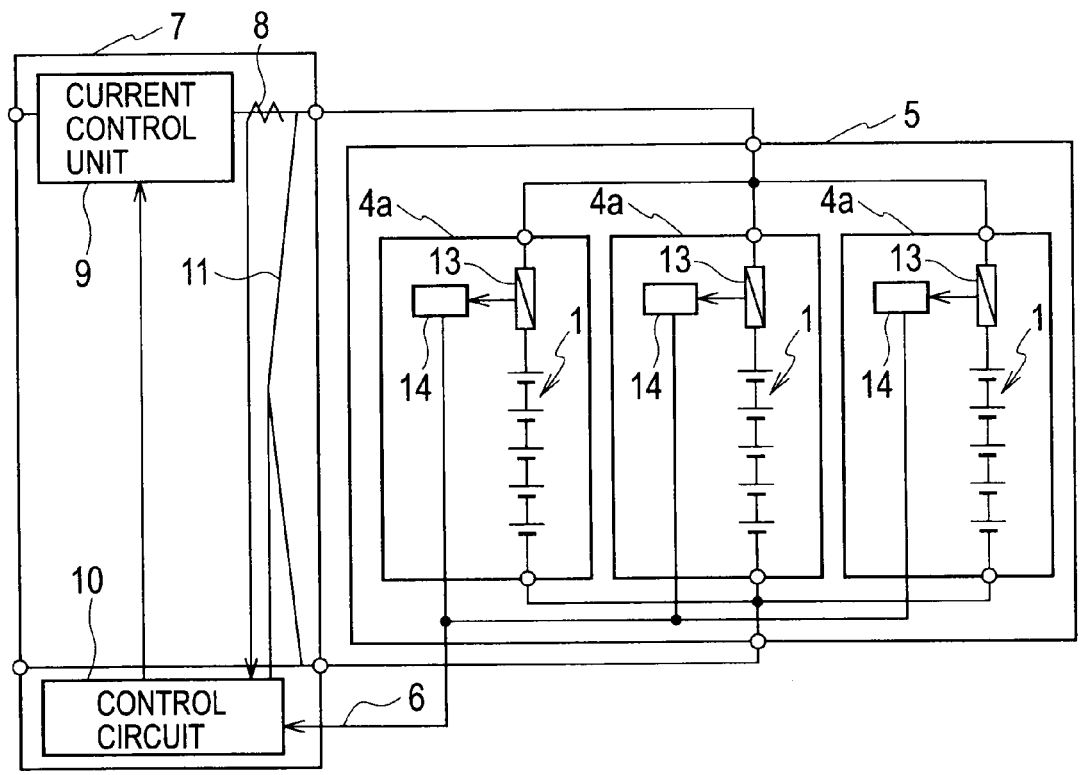
FIG. 16 is a block diagram showing a configuration of a battery system according to Embodiment 12 of the present invention.

A battery system according to Embodiment 12 of the present invention, which is shown in FIG. 16, is composed by adding the voltage detector 11 to the charge/discharge control device 7 of the battery system (refer to FIG. 12) according to Embodiment 9. A description will be made below mainly of portions of the battery system according to Embodiment 12, which are different from those of the battery system according to Embodiment 9.

The voltage detector 11 detects the output voltage of the charge/discharge control device 7 (input voltage of the battery unit 5). The voltage detected by the voltage detector 11 is sent to the control circuit 10.

In the case of having received the fuse blowout signal sent from the battery unit 5 through the communication channel 6, the control circuit 10 decides the upper limit value of charge/discharge power, which is supplied from the charge/discharge control device 7 to the battery unit 5, so that the upper limit value of the charge/discharge power concerned can become smaller than the upper limit value of the charge/discharge power of the case where the battery unit 5 is normal. Then, the control circuit 10 refers to the power value obtained by arithmetically operating the current value detected by the current detector 8 and the voltage value detected by the voltage detector 11, and instructs the current control unit 9 to restrict the charge/discharge power, which is supplied from the charge/discharge control device 7 to the battery unit 5, to the decided power value or less.

In this case, the control circuit 10 defines the charge/discharge power as the command value, calculates the power value, which is to be corrected, from the difference between the charge/discharge power obtained by the arithmetic operation and the command value, and divides the thus calculated power value by the output voltage detected by the voltage detector 11, thereby uses the obtained solution as the command for restricting the current, which is to be sent to the current control unit 9.

Figure 17:
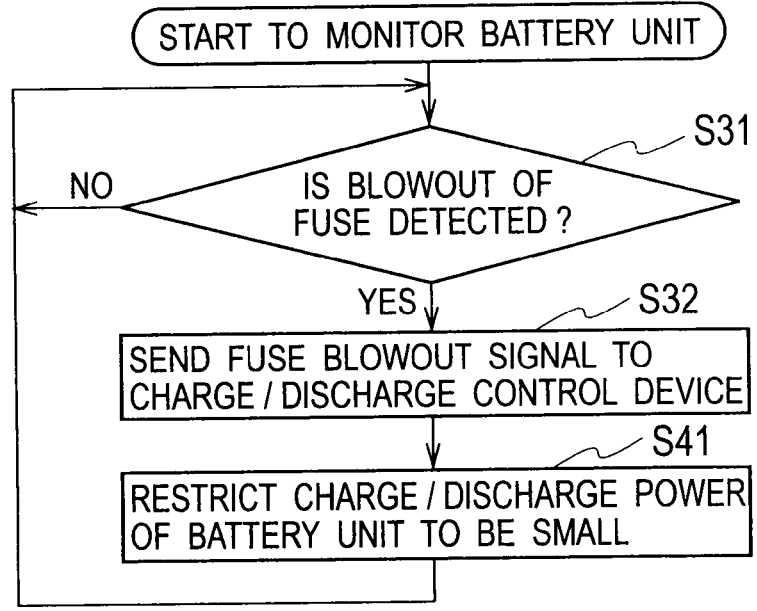
FIG. 17 is a flowchart showing operations of the battery system according to Embodiment 12 of the present invention.

Next, while referring to FIG. 17, a description will be made of operations of the battery system according to Embodiment 12 of the present invention by focusing on battery unit monitoring processing thereof. Note that, in a flowchart of FIG. 17, steps of executing the same processing as the processing of the battery system according to Embodiment 9, which is shown in the flowchart of FIG. 13, will be simply described while assigning the reference numerals used in FIG. 13 thereto.

First, since processing of Step S31 and Step S32 is the same as that shown in FIG. 13, a description thereof will be omitted. Subsequently, the charge/discharge power of the battery unit is restricted to be small (Step S41). Specifically, the control circuit 10 responds to the fuse blowout signal sent from the battery unit 5 through the communication channel 6, and instructs the current control unit 9 to restrict the charge/discharge power. The current control unit 9 responds to the instruction from the control circuit 10, and controls the magnitude of the charge/discharge power from the charge/discharge control device 7 to the battery unit 5. Thereafter, the operations return to Step S31, and the above-described processing is repeated.

In accordance with the battery system according to Embodiment 12, even in the case where apart of the battery arms 4 included in the battery unit 5 is isolated by the blowout of the fuses 13 in response to the occurrence of the abnormality in the batteries 1, the charge/discharge power supplied to the battery unit 5 is set at a power value smaller than that of the time when the battery unit 5 is normal, whereby the overcurrent of the charge/discharge current flowing through the battery arms 4a is prevented. Therefore, even after the fuses 13 cause the blowout, the battery unit 5 can continue the operation thereof.

Embodiment 13

In the case of having received the fuse blowout signals sent from the battery unit 5, a battery system according to Embodiment 13 of the present invention reduces the power value of the charge/discharge power step by step in response to the number of the fuse blowout signals. A configuration of the battery system according to Embodiment 13 is the same as the configuration of the battery system according to Embodiment 12, which is shown in FIG. 16, except the function of the control circuit 10.

In the case of having received the fuse blowout signals sent from the battery unit 5 through the communication channel 6, the control circuit 10 decides the upper limit value of the charge/discharge power, which should be supplied from the charge/discharge control device 7 to the battery unit 5, from the upper limit value of the charge/discharge power of the case where the battery unit 5 is normal to the power value that becomes smaller step by step in accordance with the increase of the number of the fuse blowout signals. Then, the control circuit refers to the power value obtained by arithmetically operating the current value detected by the current detector 8 and the voltage value detected by the voltage detector 11, and instructs the current control unit 9 to restrict the charge/discharge power to the decided power value or less.

Figure 18:
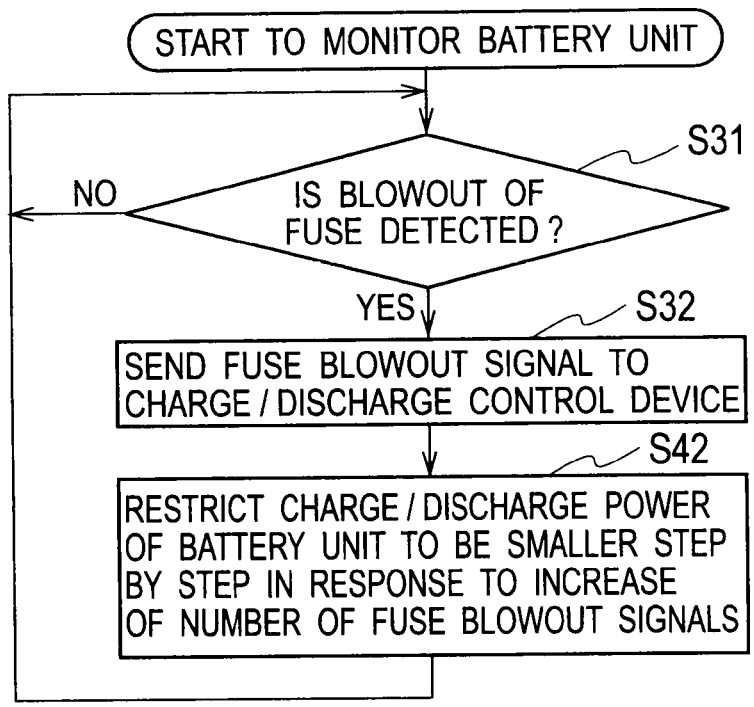
FIG. 18 is a flowchart showing operations of a battery system according to Embodiment 13 of the present invention.

Next, while referring to FIG. 18, a description will be made of operations of the battery system according to Embodiment 13 of the present invention by focusing on battery unit monitoring processing thereof. Note that, in a flowchart of FIG. 18, steps of executing the same processing as the processing of the battery system according to Embodiment 12, which is shown in the flowchart of FIG. 17, will be simply described while assigning the reference numerals used in FIG. 17 thereto.

Since processing of Step S31 and Step S32 is the same as that shown in FIG. 13, a description thereof will be omitted. Subsequently, the charge/discharge power of the battery unit is restricted to be smaller step by step in response to the increase of the number of the fuse blowout signals (Step S42). Specifically, as mentioned above, the control circuit 10 responds to each of the fuse blowout signals sent from the battery unit 5 through the communication channel 6, and instructs the current control unit 9 to reduce the charge/discharge power step by step in accordance with the increase of the number of the fuse blowout signals. The current control unit 9 responds to the instruction from the control circuit 10, and controls the magnitude of the charge/discharge power from the charge/discharge control device 7 to the battery unit 5. Thereafter, the operations return to Step S31, and the above-described processing is repeated.

In accordance with the battery system according to Embodiment 13, even in the case where the battery arms 4 included in the battery unit 5 are isolated by the blowout of the fuses 13 in response to the occurrence of the abnormality in the batteries 1, the charge/discharge power supplied to the battery unit 5 is reduced step by step in response to the number of the isolated battery arms 4, whereby the overcurrent of the charge/discharge current flowing through the battery arms 4a is prevented. Therefore, even after the fuses 13 cause the blowout, the battery unit 5 can continue the operation thereof.

Embodiment 14

In the case of having received the fuse blowout signals sent from the battery unit 5, a battery system according to Embodiment 14 of the present invention reduces the power value of the charge/discharge power in response to the number of battery arms, in each of which the abnormality has occurred, with respect to the total number of the battery arms. A configuration of the battery system according to Embodiment 14 is the same as the configuration of the battery system according to Embodiment 12, which is shown in FIG. 16, except the function of the control circuit 10.

When the Z pieces of fuse blowout signals are sent from the battery unit 5 through the communication channel 6 to the control circuit 10, the control circuit 10 decides the upper limit value of the charge/discharge power, which should be supplied from the charge/discharge control device 7 to the battery unit 5, so that the upper limit value can become the ratio Z/N of the number N of the battery arms 4a and the number Z of the fuse blowout signals. Then, the control circuit 10 refers to the power value obtained by arithmetically operating the current value detected by the current detector 8 and the voltage value detected by the voltage detector 11, and instructs the current control unit 9 to restrict the charge/discharge power to the decided power value or less.

Figure 19:
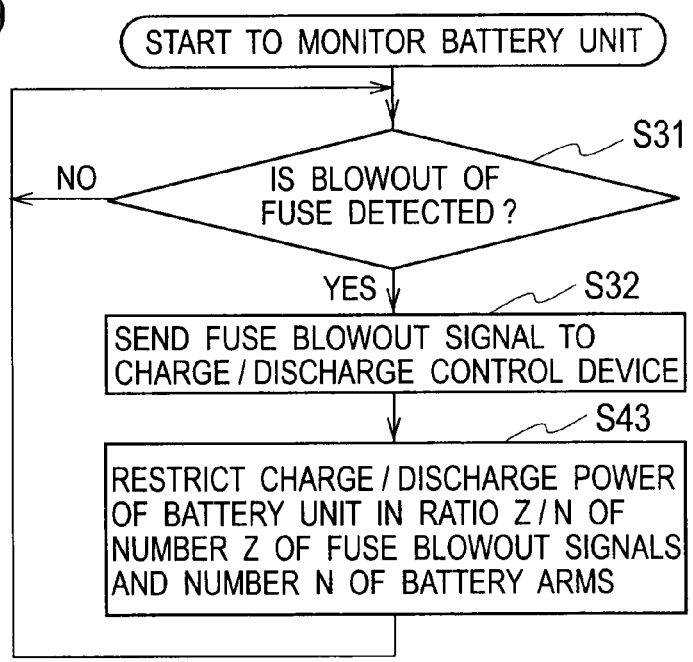
FIG. 19 is a flowchart showing operations of a battery system according to Embodiment 14 of the present invention.

Next, while referring to FIG. 19, a description will be made of operations of the battery system according to Embodiment 14 of the present invention by focusing on battery unit monitoring processing thereof. Note that, in a flowchart of FIG. 19, steps of executing the same processing as the processing of the battery system according to Embodiment 12, which is shown in the flowchart of FIG. 17, will be simply described while assigning the reference numerals used in FIG. 17 thereto.

Since processing of Step S31 and Step S32 is the same as that shown in FIG. 13, a description thereof will be omitted. Subsequently, the charge/discharge power of the battery unit is restricted in the ratio Z/N of the number Z of the fuse blowout signals and the number N of the battery arms (Step S43). Specifically, the control circuit 10 instructs the current control unit 9 to restrict the charge/discharge power in the ratio Z/N of the number N of the battery arms 4a and the number Z of fuse blowout signals sent from the battery unit 5 through the communication channel 6. The current control unit 9 responds to the instruction from the control circuit 10, and controls the magnitude of the charge/discharge power supplied form the charge/discharge control device 7 to the battery unit 5. Thereafter, the operations return to Step S31, and the above-described processing is repeated.

In accordance with the battery system according to Embodiment 14, even in the case where a part of the battery arms 4a included in the battery unit 5 is isolated by the blowout of the fuses 13 in response to the occurrence of the abnormality in the batteries 1, the charge/discharge power is reduced in the ratio Z/N of the number Z of isolated battery arms 4a with respect to the number N of battery arms 4a, and the charge/discharge current flowing through the battery arms 4a is set at the same value as that of the time when the battery unit 5 is normal, whereby the overcurrent of the charge/discharge current flowing through the battery arms 4a is prevented. Therefore, even after the fuses 13 cause the blowout, the battery unit 5 can continue the operation thereof.

Embodiment 15

Figure 20:
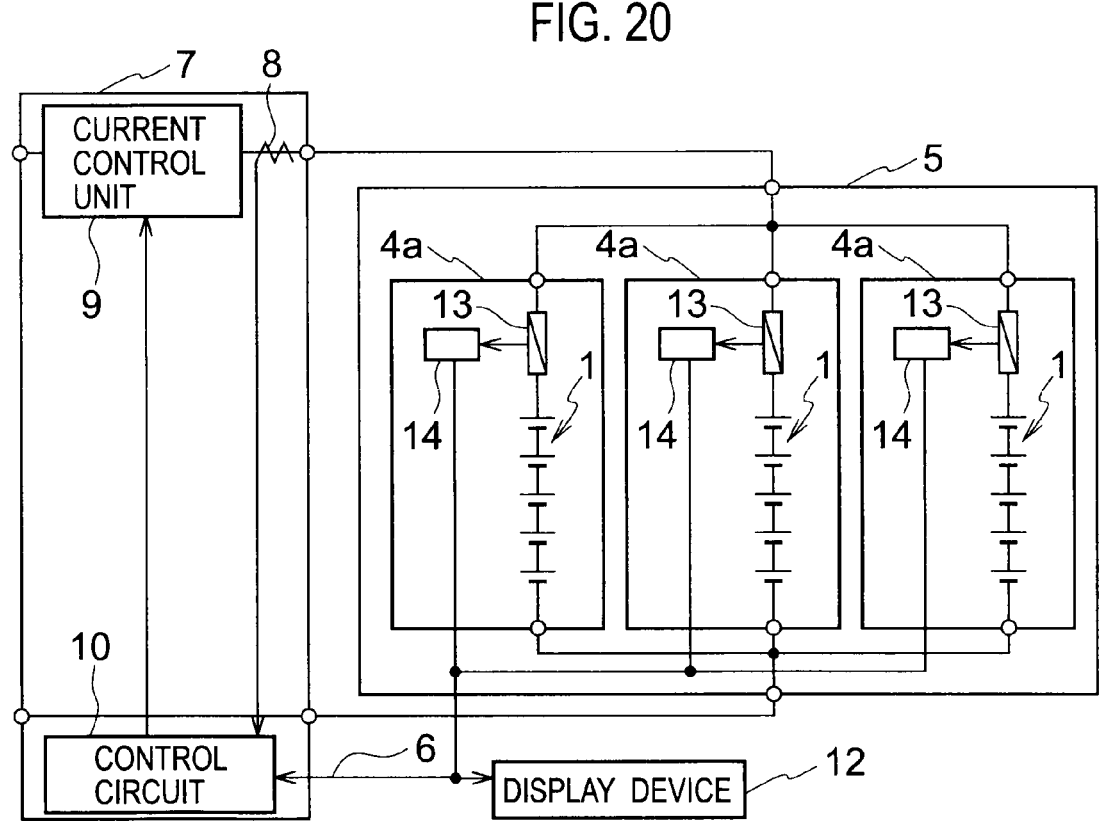
FIG. 20 is a block diagram showing a configuration of a battery system according to Embodiment 15 of the present invention.

A battery system according to Embodiment 15 of the present invention, which is shown in FIG. 20, is composed by adding a display device 12 to the battery system according to Embodiment 9 (refer to FIG. 12). The display device 12 displays information, which indicates the battery arm 4a in which the fuse 13 has caused the blowout, in response to the fuse blowout signal sent from the battery unit 5.

In accordance with the battery system according to Embodiment 15 of the present invention, the battery arm 4a including the battery 1 in which the abnormality has occurred can be identified by the display device 12. Therefore, in the battery system according to Embodiment 15 of the present invention, the battery 1 in which the abnormality has occurred can be urged to be exchanged, such an operation that requires the overcurrent for the battery arm 4a can be avoided, and so on.

What is claimed is:

1. A battery system comprising:
a battery unit in which battery arms are connected in parallel; and
a charge/discharge control device that controls a charge/discharge current of the battery unit,
wherein each of the battery arms comprises:
a battery composed of one or more battery cells connected in series;
a switch connected in series to the battery; and
a battery monitoring device that, in a case of having detected abnormality of the battery, opens the switch to thereby isolate the battery arm including the abnormal battery, and sends a switch opening signal indicating that the switch has been opened to the charge/discharge control device,
the charge/discharge control device comprises:
a current detector for detecting the charge/discharge current flowing between the charge/discharge control device and the battery unit;
a current control unit for controlling a magnitude of the charge/discharge current; and
a voltage detector for detecting an input voltage of the battery unit; and
in a case where the charge/discharge control device receives one more of the switch opening signals from the battery unit, the current control unit controls the charge/discharge current to gradually reduce a charge/discharge power of the battery unit in a stepwise manner in response to a number of the received switch opening signals based on a detected value of the current detector and a detected value of the voltage detector.

2. The battery system according to claim 1, wherein, in the case where the charge/discharge control device receives one or more of the switch opening signals from the battery unit, the charge/discharge control device controls the charge/discharge current to reduce the charge/discharge power of the battery unit in the stepwise manner in a ratio of the number of the received switch opening signals to the number of the battery arms.

3. The battery system according to claim 1, wherein the switch is a fuse, and
in a case where the battery monitoring device detects a blowout of the fuse, the battery monitoring device sends a fuse blowout signal indicating that the blowout of the fuse has been detected to the charge/discharge control device as the switch opening signal.

* * * * *